Dec. 18, 1951 R. O. SCOFIELD 2,579,098
COOLING APPARATUS
Filed Jan. 15, 1945 3 Sheets-Sheet 1
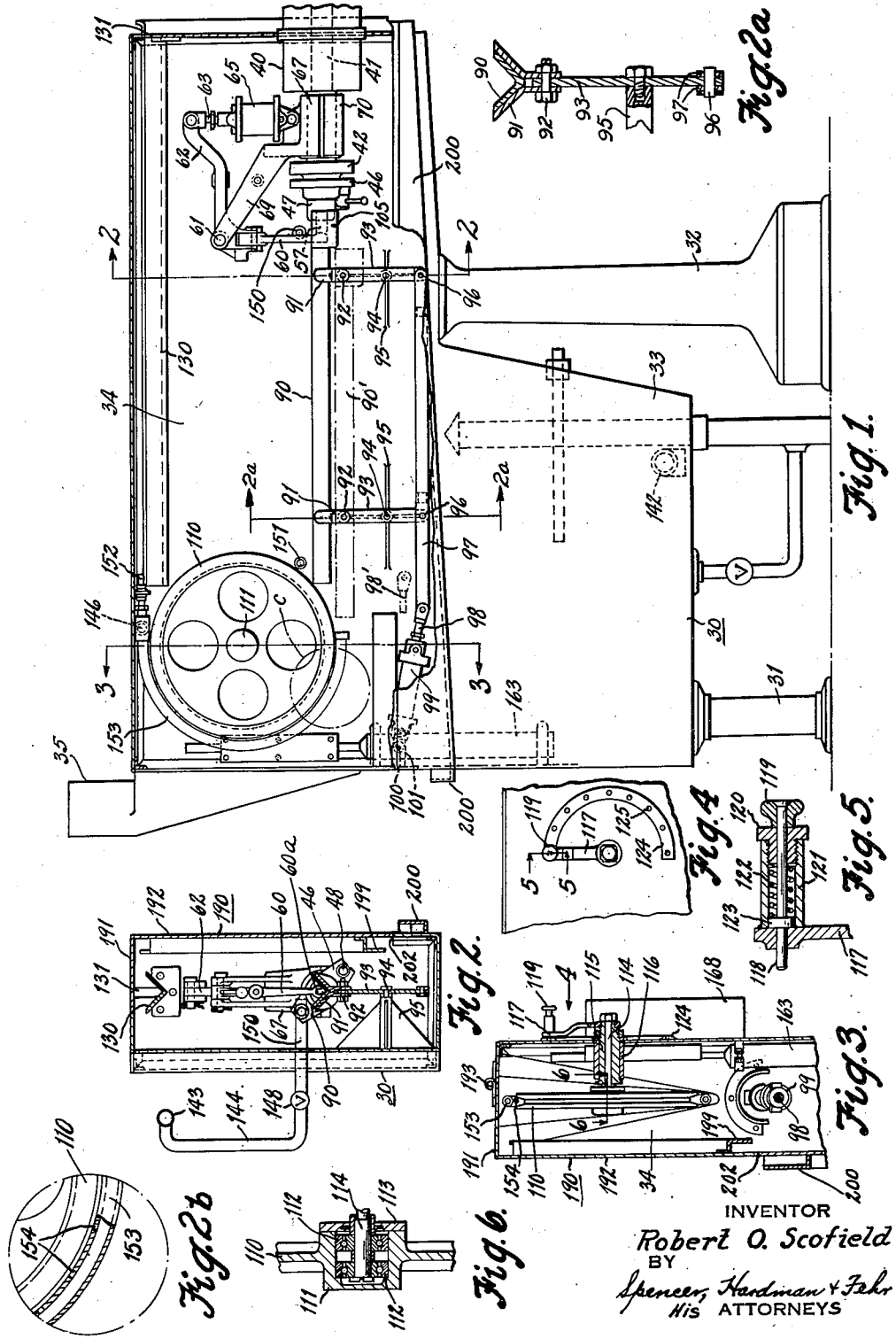
INVENTOR
Robert O. Scofield
BY
Spencer, Hardman & Fahr
His ATTORNEYS Dec. 18, 1951 R. O. SCOFIELD 2,579,098
COOLING APPARATUS
Filed Jan. 15, 1945 3 Sheets-Sheet 2
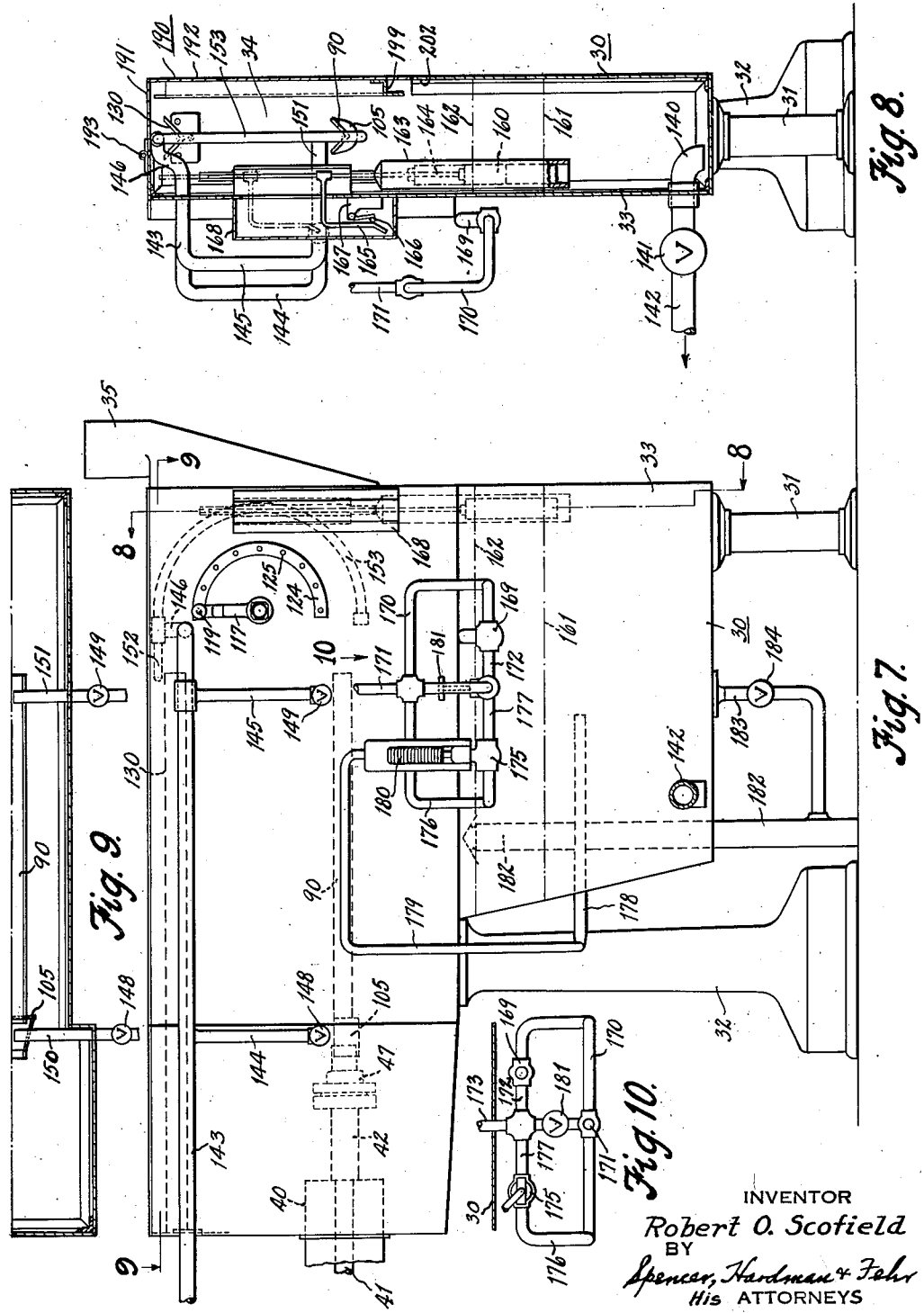
INVENTOR
Robert O. Scofield
BY
Spencer, Hardman & Fehr
His ATTORNEYS Dec. 18, 1951  R. O. SCOFIELD  2,579,098
COOLING APPARATUS
Filed Jan. 15, 1945  3 Sheets-Sheet 3
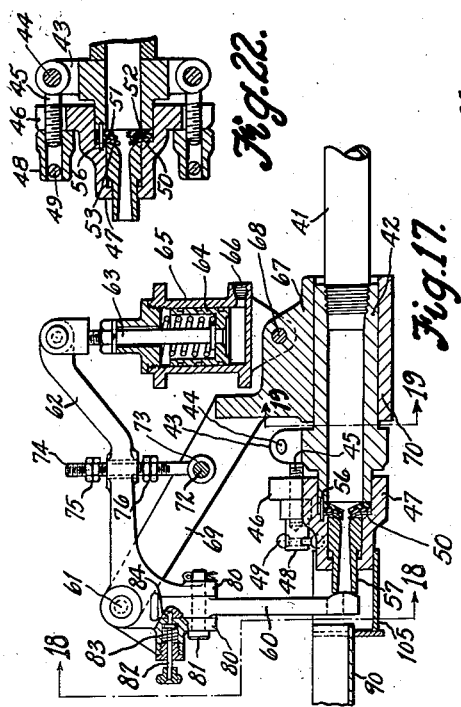
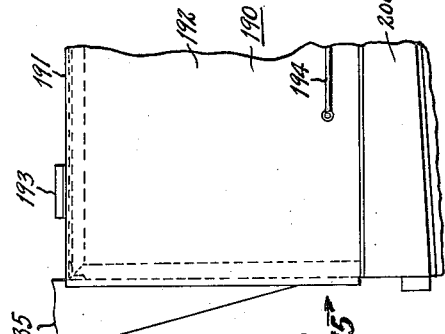
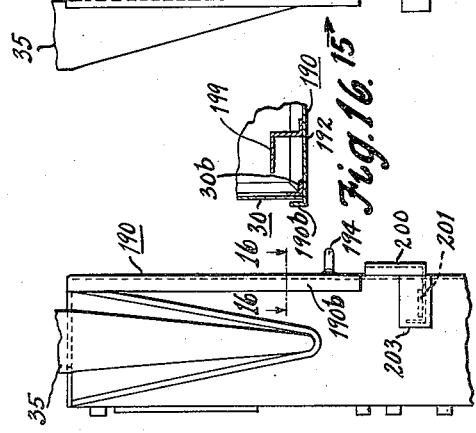
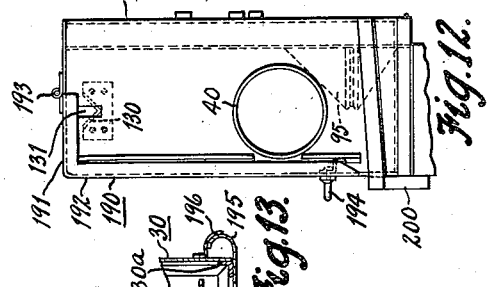
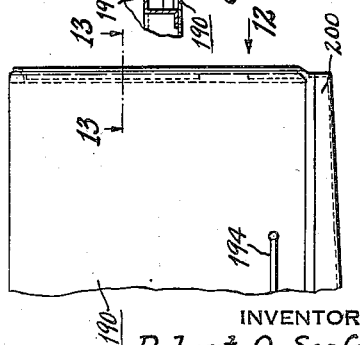
INVENTOR
*Robert O. Scofield*
BY
*Spencer, Hardman & Fehr*
His ATTORNEYS Patented Dec. 18, 1951

2,579,098

UNITED STATES PATENT OFFICE 2,579,098

COOLING APPARATUS

Robert O. Scofield, Warren, Ohio, assignor to General Motors Corporation, Detroit, Mich., a corporation of Delaware Application January 15, 1945, Serial No. 572,885

6 Claims. (Cl. 18—6)

This invention relates to the continuous vulcanization of a rubber coating formed upon a wire for electrical use. The wire passes continuously through an extruder which causes rubber compound to be formed around the wire and through a vulcanizing chamber containing steam under pressure, through a device which causes the vulcanized rubber coating to be cooled by the application of water and through a device which dries the coating preparatory to winding the wire upon a reel. On leaving the vulcanizing chamber, the wire passes through a seal which minimizes the escape of steam from the vulcanizing chamber. A form of seal, which has been used, is disclosed in the reissue patent to Cherry and Lamplough, No. 19,820, Western Electric patents on rubber coating or continuous vulcanization, which discloses the location of the seal within a casing which confines such steam and vapor as may escape through the seal and which is provided with an exhaust stack to carry away the steam and a drain pipe for carrying away any condensation. From the casing, the wire passes to the means for cooling and drying the vulcanized rubber coating.

It is an object of the present invention to provide means for beginning to cool the wire as soon as it leaves the seal at the exit end of the vulcanizing chamber while preventing the sagging of the wire while the coating is still tender. This object is accomplished by the use of a casing which houses the seal and a horizontal trough extending from the seal a substantial distance and containing water for cooling of the wire immediately as it emerges from the seal, a wire return pulley against which water is continuously sprayed and a second trough containing water through which the wire passes before leaving the housing whereby the coating has been cooled sufficiently to make it mechanically strong enough to withstand subsequent handling.

Further objects and advantages of the present invention will be apparent from the following description, reference being had to the accompanying drawings, wherein a preferred form of embodiment of the present invention is clearly shown.

In the drawings:

Fig. 1 is a side elevation of the housing with the door removed.

Fig. 2 is a sectional view on line 2—2 of Fig. 1 but with the door in place.

Fig. 2a is a sectional view, on an enlarged scale, on line 2a—2a of Fig. 1.

Fig. 2b is a view showing fragments of a pulley and a pipe on an enlarged scale in the dot-and-dash circle C in Fig. 1, showing openings in the pipe.

Fig. 3 is a sectional view on line 3—3 of Fig. 1 with the door in place.

Fig. 4 is a fragmentary view looking in the direction of arrow 4 of Fig. 3.

Fig. 5 is a fragmentary sectional view on line 5—5 of Fig. 4 and is drawn to a larger scale.

Fig. 6 is a fragmentary sectional view on line 6—6 of Fig. 3 and is drawn on a larger scale.

Fig. 7 is a view showing the side of the apparatus opposite to that shown in Fig. 1.

Fig. 8 is an end view partly in section, the section being on the line 8—8 of Fig. 7.

Fig. 9 is a fragmentary sectional view taken on line 9—9 of Fig. 7.

Fig. 10 is a plan view of certain pipe connections looking in the direction of arrow 10 of Fig. 7.

Fig. 11 is a fragment of the right end of the housing as viewed in Fig. 1 with the door in place.

Fig. 12 is a fragmentary view looking in the direction of arrow 12 of Fig. 11.

Fig. 13 is a fragmentary sectional view taken on line 13—13 of Fig. 11.

Fig. 14 is a fragmentary view on the left end of the housing as viewed in Fig. 1 with the door in place.

Fig. 15 is a view looking in the direction of arrow 15 of Fig. 14.

Fig. 16 is a fragmentary sectional view taken on line 16—16 of Fig. 15.

Fig. 17 is a longitudinal sectional view of the seal shown in side elevation in Fig. 1.

Fig. 18 is a sectional view on line 18—18 of Fig. 17.

Fig. 19 is a fragmentary sectional view on line 19—19 of Fig. 17.

Fig. 20 is a sectional view of the seal shown in Fig. 17 and is drawn to a larger scale.

Fig. 21, drawn to the same scale as Fig. 20, is a view of the seal in the direction of arrow 21 of Fig. 20.

Fig. 22 is a fragmentary sectional view similar to Fig. 17 but taken on line 22—22 of Fig. 18.

Referring to Figs. 1 and 7, a housing 30 is supported from the floor by pedestals 31 and 32 and it provides a water tank 33 and a chamber 34 for confining the water used in cooling the wire coating and the steam escaping from the seal. The housing 33 is provided with a stack 35 which may be connected with means for exhausting vapor from the housing.

As shown in Fig. 1, there extends into the chamber 34 of the housing 30 a cylindrical part 40 which is the enclosure of a steam jacket surrounding a pipe 41 containing steam under pressure which provides a vulcanizing chamber for the wire coating. As shown in Fig. 17, the pipe 41 is threaded into a tubular member 42, the left end of which is provided with oppositely disposed pairs of ears 43 for supporting pins 44 passing through eyes on the ends of screws 45 which are received by notches between bars or lugs 46 extending diametrically from a tubular member 47 which telescopically engages the member 42. The member 47 is secured to the member 42 in the position shown in Fig. 17 by the tightening of nuts 48 each provided with a cross pin 49 to facilitate the tightening and release of the nuts. Between the left end of the member 42 and a shoulder 50 of the member 47 there is located a seal which comprises discs 51 and 52 of material such as rubber and a resilient metal disc 53 which is radially slit at 53a to provide resilient tongues 54 (Figs. 20 and 21). Aligned holes 55 extend through the three discs for the purpose of receiving a pin 56, Fig. 17, which maintains the discs in registry. Fig. 20 shows a coated wire W extending through the three discs and in engagement with resilient discs 51 and 52. The member 47 supports a tubular wire guide 57 which serves to transmit pressure to the seal from an arm 60 of a bellcrank lever pivoted at 61 and having an arm 62 connected with a rod 63 attached to a piston 64 within a cylinder 65 into which fluid pressure is admitted at 66. A bracket 67 carries a pin 68 which supports the cylinder 65 and has arms 69 which carry the pin 61. The bracket 67 is shaped, as shown in Fig. 17, to fit around the member 42 and to cooperate with a similarly shaped cap 70 attached to the bracket by screws 71, see Fig. 19. The bracket arm 69 supports a pin 72 passing through an eye 73 of a screw 74 upon which are threaded pairs of nuts 75 and 76 which limit the movement of the arm 62 relative to the bracket 67 and, therefore, movement of the arm 60 relative to the seal. The arm 62 has integral ears 80 which support a pin 81 on which the arm 60 is pivoted for movement in a plane at right angles to the plane of rotation of the arm 62 about the pivot pin 61. The arm 60 is retained in position, shown in Fig. 17, by pin 82 urged by a spring 83 into a hole 84 in the arm 60. In order to spread the wire through the seal, it is necessary to remove the member 47. To make this possible the pin 82 is withdrawn from the hole 84 so that the arm 60 may be moved laterally.

The lower end of the arm 60 is notched at 60a so that it may straddle the wire W while it presses upon the member 57 in order to effect the proper engagement with the proper size of the wire such as to minimize the escape of steam without marring the relatively soft coating of the wire. As the wire moves through the member 57, it is caused to rest on the bottom of a trough 90, supported by brackets 91, Fig. 1, connected by pins 92 with levers 93 pivotally supported by rods 94 upon brackets 95 supported within the housing. The lower ends of the levers 93 are connected by pins 96 with a bar 97 connected with a piston rod 98 attached to a piston, not shown, and cooperating with a pressure fluid cylinder 99 pivoted at 100 on a bracket 101. When the rod 98 occupies the position relative to the cylinder 99, as shown in full lines in Fig. 1, the trough 90 will be in full line position shown so that the wire supported thereby will be located horizontally and in alignment with the seal. When pressure fluid is admitted to the left end of cylinder 99, the rod 98 will move into the dot-dash line position 98'. Then the trough will move into the dot-dash line position 90'. This is done in order that the member 47 in Fig. 17 may disengage from the member 42 since the trough 90 carries an extension 105 which fits around the left end of the member 47. In a manner to be explained later, water is fed into the trough 90 and the extension 105 so that the member 57 will contain water and the cooling of the rubber coating begins immediately after it leaves the seal; and the cooling continues to a substantial amount while the wire passes toward the left through the trough 90.

As the wire leaves the trough 90, it passes around a grooved pulley 110, the hub 111 of which (Fig. 6) supports ball bearings 112 enclosed by shaft seal 113. The bearings journal the pulley 110 upon a fixed shaft 114 which passes eccentrically through a bushing 115 journalled in a tubular support 116 supported by the housing. The bushing 115 is connected with a lever arm 117 for the purpose of turning the bushing 115 so that the shaft 114 and the axis of the pulley 110 may be raised or lowered for the purpose of locating that portion of the wire extending from the trough 90 to the pulley 110 in a horizontal position which is in alignment with the wire passing along the trough. In order to adapt the apparatus for use for various sizes of wire necessary to vary the elevation of the pulley axis, this is accomplished by turning the arm 117 and the arm is retained in one of several positions by a pin 118, Fig. 5, having a pull knob 119 and being axially supported by the arm 117 and by a bushing 120 threaded into a tube 121 welded to the arm 117 and housing a spring 122 confined between the bushing 120 and a shoulder 123 of the pin 118. As shown in Fig. 4, the housing provides an arcuate bar 124 having a plurality of holes 125, each for receiving the pin 118. These holes 125 may be variously numbered in order to show what adjustment of the pulley is necessary so that the apparatus may be adapted for a particular size of insulated wire.

After leaving the pulley 110, the wire passes through a trough 130 and out through a notch 131 in the right end wall of the housing 30, Fig. 1. After leaving the housing 30, the wire passes through a suitable drying apparatus and then to the wind-up reels.

Referring to Fig. 8, the bottom of the tank 33 is connected through an L 140, a valve 141 and a pipe 142 with the intake of a water circulated pump not shown. The outlet of this pump is connected with a pipe 143 (Fig. 7) connected with branch pipes 144, 145 and 146. Pipes 144 and 145 are connected through valves 148 and 149 respectively with pipes 150 and 151 respectively which empty into the lower trough 90. Branch pipe 146 is connected with a nozzle 152 which directs water over the wire passing through the trough 130. Pipe 146 is connected with an arcuate pipe 153 having holes 154 through which water is sprayed against the wire as it passes around the pulley 110. It is therefore apparent that from the time the wire leaves the seal at the left end of part 42 (Fig. 17) until the wire leaves the notch 131 at the right end of the trough 130, the wire is subjected to the application of circulating water. Before the wire passes around the pulley, that portion of it between the seal and the pulley, is maintained horizontal so that no sagging in the wire can occur which will tend to crack the coated wire when it is still soft. By the time the wire has reached the pulley, its coating has cooled sufficiently to allow it to be bent around the pulley without harming the coating. By the time the wire has left the trough 130, its coating has hardened sufficiently to withstand subsequent handling.

The tank 33 provides for the storage of the circulating water and to catch the water which gravitates from the troughs and from the spray nozzles within the chamber 34. As some of this water is lost by evaporation and mixture with the vapor which is exhausted from the stack 35, it is necessary to replenish the supply in the tank 33. This is done automatically in response to movement of a float 160 which moves with the water from its minimum lower level indicated by the dot-and-dash line 161 to the maximum upper level indicated by the dot-and-dash line 162 in Fig. 8. The float is guided by a tube 163 supported by the housing 30 and it moves a rod 164 connected with an arm 165 extending through a slot 165a in the housing and adapted to engage the actuator 166 of a switch 167 mounted on the housing and enclosed by a cover 168 attached to the exterior of the housing as shown in Fig. 8. The switch 167 controls a magnetic valve 169, the inlet of which is connected by a pipe 170 with a pipe 171 connected with the city water supply. The outlet of the valve 169 is connected by a pipe 172 with a pipe 173 which empties into the tank 33, see Fig. 10. When the level of water in the tank 33 is at the lower level 161, the float, due to gravity, has moved downwardly far enough to cause arm 165 above the flared out portion thereon to operate the switch 167 to a closed position to connect the magnet (not shown) of the valve 169 in an electrical circuit. When the magnet is energized it will automatically open the valve 169 to allow water to flow into the tank; and, when the water level reaches the line 162 the arm will move out of the path of the actuator 166. When this happens the switch 167 opens and causes the magnet to become deenergized and the valve 169 closes to discontinue the flow of water into the tank into the city water supply. However, if the temperature of the water within the tank rises to a value such that the water does not effectively cool the wire while passing through the housing, an additional supply of cold city water is admitted into the tank automatically by a temperature responsive valve 175 whose inlet is connected by pipe 176 with pipe 171 and whose outlet is connected by pipe 177 with pipe 173. The actuation of the valve 175 is effected by the expansion of a suitable fluid contained within a bulb 178 located in the water of the tank 33, and connected by pipe 179 with a flexible metal bellows 180. The tank 33 is initially filled with city water by opening a valve 181, Fig. 10, which connects the city water supply line 171 with the pipe 173. In order that the upper water level indicated by line 162 will not be exceeded, the tank is provided with an overflow pipe 182 opening at the level 162 and passing down through the bottom of the tank to a drain. The tank 33 is provided with a bottom drain 183 with pipe 182 and controlled by valve 184.

Referring to Figs. 11 through 16, the door 190 includes a horizontal portion 191 covering a part of the top of the housing and a vertical portion 192 covering the opening seen in Fig. 1. The cover is attached to the top wall of the housing by hinges 193 and it may be lifted and rotated upon its hinges by the handles 194. The right horizontal and vertical edges of the door are shaped to provide a semi-cylindrical bead 195, Fig. 13, which engages a similarly formed bead or flange 196 provided by the housing 30. As shown in Fig. 13, the door 190 fits closely against the edge of the housing 30 and an angle iron 30a which reenforces it. Any water which escapes through the joint between the cover and the angle iron 30a is trapped by the cooperated flanges 195 and 196 and gravitates into a gutter 200, the bottom wall of which is inclined from right toward left in Fig. 1 and the water collecting in the gutter returns to the tank through a slot 201, Fig. 15, in the left end wall of the housing. In order that the joint between the cover 190 and the angle iron 30a of Fig. 13, will not be subjected to action of water spray moving gently from left to right within the housing chamber 34, the cover carries a baffle strip 199 in Fig. 13. The strip 199 extends vertically at both ends as shown in Fig. 16 and also horizontally as shown in Figs. 2 and 3 in order to limit the escape of water at the meeting edges of the cover 190 and a wall 202 of the housing as shown in Figs. 2 and 3. The baffle plate 199 as shown in Fig. 16, prevents the application of water spray directly into the joint between the housing angle 30b and the cover 190. The left end of the cover 190 is provided with a flange 190b which overlaps the left end of the housing 30 and any water which escapes through the joint between angle 30b and cover 190 is caused to gravitate down the inside of the flange 190b and into the control section 203, Fig. 15. It is apparent that the gutter, Figs. 2 and 3, will catch any water which seeps through the joint between the parts 190 and 202.

The following is a résumé of manipulations required when placing the apparatus in condition for operation. The cover 190 is lifted and turned back upon its hinges so that its normally horizontal portion 191 rests upon the top of the housing 30. By opening the valve 181, the city water is admitted to the tank 33 until the level reaches the line 162. The trough 90 is located in the position of 90' in Fig. 1 by admitting pressure fluid to the left end of the cylinder 99. The pin 82, Fig. 17, is retracted and the arm 60 is moved laterally out of alignment with the part 57. The nuts 48 are unscrewed to the extent that will permit them to clear the lugs 46 so that the screws 45 may be rotated on the pins 44 in order to free the part 47 from connection with the part 42. Then the seal discs can be removed from their support and threaded over the wire which is passed through the vulcanizing chamber and finally through the tubular member 42. This wire is a section of uncoated wire unreeled from the supply reel or it may be a lead wire welded thereto. The lead wire is passed around the pulley 110 and along the trough 130 and through the notch 131 and then through the drying apparatus and then it is attached to the take-up reel. The seal and the member 47 are reassembled with the tube 42 as shown in Fig. 17 and the arm 60 is located for engagement with the member 57 and the trough 90 is returned to the full line position shown in Fig. 1. The axis of the pulley 110 is adjusted vertically by rotating the arm 117 which is located by bringing its pin 118 into alignment with the hole 125 which bears the mark corresponding to the size of the wire to be handled by the apparatus. Fluid pressure is applied to the cylinder 65, Fig. 17, in order to obtain the amount of pressure required between the seal and the insulation of the wire passing through it. The door 190 is closed and the operation of the water circulating pump is started so that water is flowing into the troughs 90 and 130 and against the groove of the pulley 110. The extruder head and the vulcanizing chamber are made ready for operation and the rotation of the take-up reel is begun.

While the embodiment of the present invention constitutes a preferred form, it is to be understood that other forms might be adopted, all coming within the scope of the claims which follow.

What is claimed is as follows:

1. Apparatus for cooling the insulating coating formed on a wire comprising a housing, a sealing member for engaging the coating of the wire when it leaves a vulcanizing chamber and enters the housing; a horizontal trough within the housing for maintaining the coated wire horizontal as it moves from the sealing member; a grooved wheel to direct the coated wire for movement in a direction differing from the direction of movement from the sealing member; and means within the housing for effecting relative vertical movement between the trough and the axis of the wheel in order to compensate for differences in the outside diameter of the coated wire whereby the wire remains horizontal to its first contact point with the wheel.

2. Apparatus for cooling the insulating coating formed on a wire comprising a housing; a sealing member supported by the housing and located for movement of the coated wire therethrough in a substantially horizontal direction; a horizontal trough within the housing for maintaining the coated wire horizontal as it moves from the sealing member, said trough having provisions for directing coolant to the sealing member, a second trough substantially parallel to the first trough for guiding the coated wire to an exit of the housing, and a grooved wheel for guiding the coated wire from the exit of the first trough to the entrance of the second trough; and coolant applying means for directing coolant into the troughs and into the wheel groove, whereby all portions of the coated wire from the sealing member to the housing exit are subjected to the coolant.

3. Apparatus for cooling the insulating coating formed on a wire comprising a housing, a sealing member adapted to engage the coating of the wire when it leaves a vulcanizing chamber and enters the housing; a guide means within the housing for maintaining the coated wire horizontal as it moves from the sealing member, a revolving member for reversing the direction of movement of the coated wire within the chamber to an exit provided by the housing and means within the housing for adjusting vertical movement between the revolving member and the guide means to compensate for the differences in the outside diameter of the coated wire whereby the coated wire remains horizontal to its first contact point with the revolving means.

4. Apparatus for cooling the insulating coating formed on a conducting wire comprising, a housing, a sealing member supported by the housing and located for movement of the coated wire therethrough in a substantial horizontal direction; a first guide means within the housing for maintaining the coated wire horizontal as it moves from the sealing member into the housing, said guide means having provisions for directing a liquid coolant to the sealing member, a second guide means spaced from the first guide means for guiding the coated wire to an exit provided by the housing; a revolving member for guiding the coated wire from the first guide means to the second guide means; and means for applying liquid coolant to the guide means and the revolving means, whereby all portions of the coated wire from the sealing member to the exit are subjected to the coolant.

5. Apparatus for cooling the insulating coating formed on a conducting wire comprising, a sealing member adapted to engage the coating of the wire when it leaves a vulcanizing chamber and enters the housing; a first guide means within the housing for guiding the coated wire in a substantial straight line as it enters the housing; rotatable means for changing the direction of movement of the coated wire within the housing, a second guide means for guiding the coated wire in its reverse direction to an exit provided by the housing; means within the housing for the rotatable means, applying a liquid coolant to the guiding means, and to the coating of the wire including the portion thereof emerging through the sealing member; and means within the housing for effecting relative movement between the guide means and the rotatable means so as to compensate for the differences in the outside diameter of the coated wire whereby the coated wire remains in a straight line from the sealing member to the first point of contact with the reversing means.

6. Apparatus for cooling the insulating coating formed on a conductor wire comprising, a vulcanizing chamber, a cooling chamber associated with the vulcanizing chamber, a sealing member at the outlet of the vulcanizing chamber and positioned within the confines of the cooling chamber; guide means for the coated wire located within the cooling chamber for maintaining the coated wire horizontal as it moves from the sealing member; a rotatable member within the cooling chamber to direct the coated wire for movement in a different direction from the direction of movement from the sealing member to an exit provided by the cooling chamber; an eccentric support for the rotatable member; means associated with the support for vertically changing the axis of the rotatable member in order to compensate for different sizes of coated wire whereby the wire remains horizontal to its first contact point with the rotatable member.

ROBERT O. SCOFIELD.

REFERENCES CITED

The following references are of record in the file of this patent:

UNITED STATES PATENTS

| Number | Name | Date |
| --- | --- | --- |
| 451,264 | Buckman | Apr. 28, 1891 |
| 584,988 | Clement | June 22, 1897 |
| 937,551 | Remmen | Oct. 19, 1909 |
| 1,560,196 | Bastian | Nov. 3, 1925 |
| 1,754,190 | Harris et al. | Apr. 8, 1930 |
| 1,885,080 | Cherry et al. | Oct. 25, 1932 |
| 2,057,518 | Fraser et al. | Oct. 13, 1936 |
| 2,069,087 | Forstrom et al. | Jan. 26, 1937 |
| 2,212,588 | Csanyi | Aug. 27, 1940 |
| 2,426,341 | Canfield | Aug. 26, 1947 |
| 2,438,374 | Ramsey | Mar. 23, 1948 |